Oct. 20, 1942.  J. LEDWINKA ET AL  2,299,099
QUILL DRIVE
Filed July 25, 1940
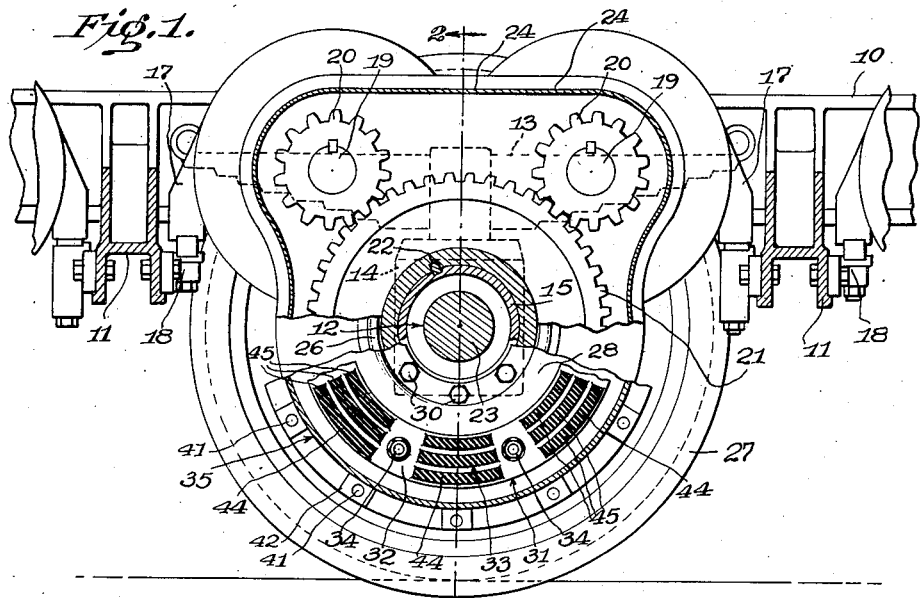
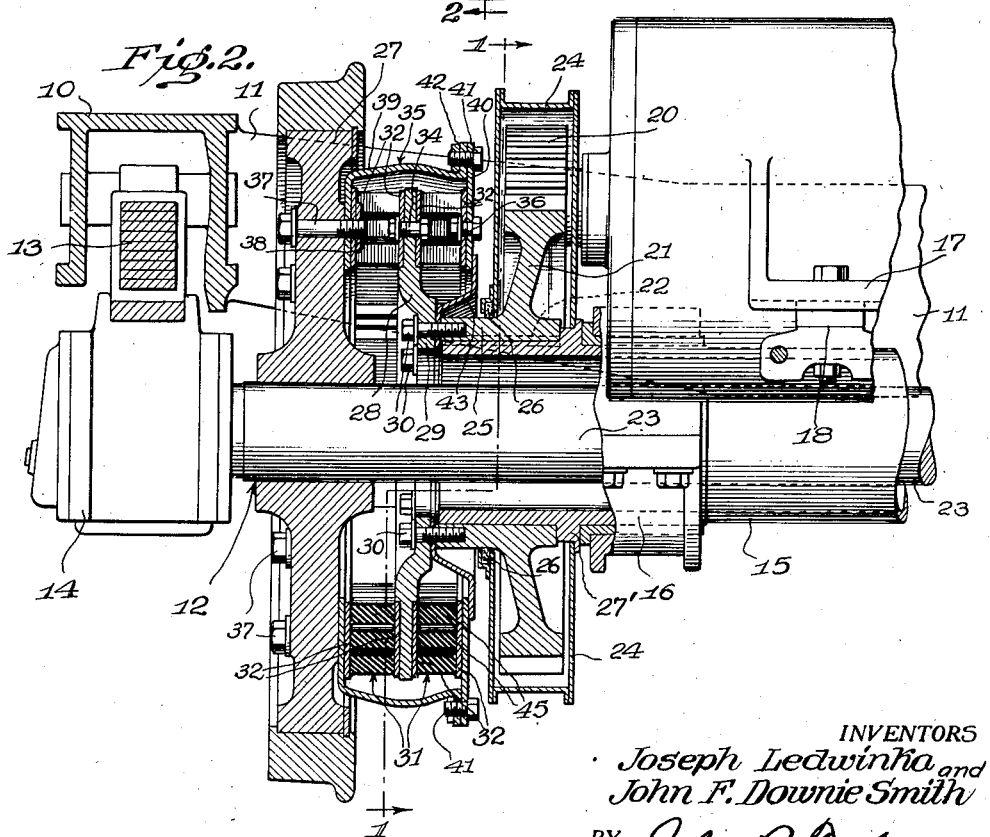
INVENTORS
Joseph Ledwinka and
John F. Downie Smith
BY John P. Barbes
ATTORNEY Patented Oct. 20, 1942

2,299,099

UNITED STATES PATENT OFFICE 2,299,099

QUILL DRIVE

Joseph Ledwinka and John F. Downie Smith, Philadelphia, Pa., assignors to Edward G. Budd Manufacturing Company, Philadelphia, Pa., a corporation of Pennsylvania Application July 25, 1940, Serial No. 347,374

4 Claims. (Cl. 105—131)

The invention relates to a quill drive particularly applicable to the driving of vehicles, such as railway vehicles.

Drives of this class as heretofore used in railway vehicles have been open to the objection that they were noisy and required multiple jointed parts including universal or sliding joints to allow the relative movements between the driven quill, which is carried by the frame in sprung relation to the wheels and axles, and the wheels to which the drive is connected from the quill. These multiple jointed parts were subject to rapid wear resulting in looseness, increased noisiness and shortness of life of the drive. Such jointed drives also required frequent lubrication of the joints or sliding parts to reduce the wear to a minimum and insure a longer life. These complicated jointed drive connections were necessitated by the fact that the quill and the motor drive thereto are preferably mounted on the sprung portion of the vehicle frame to reduce the unsprung weight, and the wheel and axle assemblies driven from the quill, being unsprung, have relative vertical movement with respect to the frame on which the quill is rotatably mounted and also have slight relative axial movement with respect to the frame.

It is an object of the invention to eliminate in large part the noisiness of such drives as heretofore constructed and to simplify the drive by eliminating the complicated jointed constructions referred to above.

This object is attained in major part by utilizing a driving connection between the quill and the part to be driven, such as the wheel of a wheel and axle assembly which provides the necessary flexibility and the necessary torque-carrying capacity by the utilization of rubber or the like to transmit forces between the driven quill and the wheel which it drives. The particular arrangement of the rubber between the driving and driven parts also constitutes a feature of the invention, the rubber being preferably arranged on a large diameter circle so as to take the torque in shear through a relatively extensive mass of the rubber, the arrangement being such as to oppose relatively small resistance to the relative vertical and axial movements between the quill and the wheel and axle assembly.

Other and further objects and advantages and the manner in which they are attained will become apparent from the following detailed description when read in connection with the drawing forming a part hereof.

In the drawing,

Fig. 1 is a fragmentary side elevation of a portion of a locomotive frame, parts being shown in section, taken approximately along the line 1—1 of Fig. 2, showing the invention applied thereto; and Fig. 2 is a fragmentary transverse vertical sectional view, the section being taken approximately along the line 2—2 of Fig. 1, showing the parts on an enlarged scale.

In the drawing, the frame is generally indicated as having side frame members, as 10, interconnected by transverse members, as 11, two of which are shown arranged on opposite sides of a wheel and axle assembly, designated generally by reference numeral 12. This frame is spring-supported in the usual manner, as by springs 13, from the wheel and axle assembly 12. As shown, the springs 13 are multiple lamination leaf springs interposed between the axle boxes, as 14, carried by the axles and the respective side frames 10. The axle boxes may be guided in their relative vertical movements with respect to the frame by the usual spaced pedestal guides (not shown). Any desired number of wheel and axle assemblies may support the frame, and all such wheel and axle assemblies may be driven in the manner now to be described for the single such assembly shown.

The quill 15 is shown mounted in a usual manner to rotate in bearings, as 16, carried by a motor-supporting frame 17 extending between transverse members 11 of the frame and rigidly secured thereto, as indicated at 18, in known manner. It is driven from a prime mover or movers, shown as twin motors carried by motor frame 17, through appropriate connections. These connections may comprise the armature shafts 19, pinions 20 thereon, and a gear 21 with which the pinions 20 mesh, the gear being fixedly secured as by a spline 22 to the end of the quill 15. The quill surrounds the axle 23 of the wheel and axle assembly 12 but is spaced therefrom to permit freely the relative up and down movement between the quill and axle due to the support of the quill on the sprung truck frame.

A gear casing 24 is shown surrounding the body of the gear 21 and pinions 20, the inner margin of the outer side of this casing surrounding the hub 25 of the gear 21 and being sealed against the hub by an oil seal ring 26. Its inner side may make a similar seal with the collar 27' of the quill which it engages.

The driving connection between the quill 15 and the wheel 27 is located in the space between the web of the wheel and the outer side of the gear casing 24. It comprises an annular driving member 28 which may be secured through an offset flange 29 to the outer face of the gear hub 25 by an annular series of bolts, such as 30. The radially outer portion of this driving member 28 is of slightly reduced thickness, extends in a radial direction and has flat faces on its opposite sides adapted for the securement of the flexible driving annuli designated generally by the reference numeral 31, see Fig. 2.

As shown in Figs. 1 and 2, these annuli may each comprise a pair of spaced sheet metal rings 32 between which is arranged a series of segmental rubber blocks designated generally by the reference character 33, the rubber being securely bonded, as by vulcanizing, to these rings prior to final assembly.

In the final assembly, flexible annuli 31 are secured to the radially outer flat faces of the driving member 28 as by bolts 34 arranged between the circumferentially spaced segments of the rubber of the annuli.

The following means may be employed to secure the flexible annuli 31 to the wheel 27. An annular radially inwardly-facing channel section casing 35 has its side walls overlapping the remote rings 32 of the flexible annuli 31 and secured thereto in final assembly, respectively, by bolts 36 extending through one side wall and the adjacent ring 32 and screw threaded studs 37 passing through the web of the wheel 27 and the adjacent side wall of the annular channel 35 and the adjacent ring 32. To obtain longer screw-threaded engagement of the studs 37 with the ring 32, a tapping block 38 may be welded as shown at each stud location to the ring 32.

For ease of assembly, the annular channel 35 may be fabricated of two parts, one a generally Z-section member 39 and the other a flat annulus 40, the two being joined together by bolts 41 extending through a radially projecting arm of the Z-section member and the periphery of the member 40. Here again, a tapping block 42 may reinforce the member 32 at the location of each bolt.

To prevent oil reaching the rubber of the flexible annuli 31 deflecting plate 43 may be secured between the bolting-on flange 29 of the member 28 and the hub 25 of the gear 21, its intermediate portion being inclined and its radially outer portion loosely overlapping the axially inner face of the radially inner margin of the member 40.

To obtain the desired flexibility and yet insure adequate rubber to take the torque and to facilitate the assembly by means of the bolts 27, 29 and 30, the rubber is preferably arranged annularly in spaced segments 44. Each of these segments may comprise a series of radially spaced circumferentially extending strips 45, these strips being of their greatest dimension in circumferential direction, relatively thin radially and axially of considerably greater dimension than radially but of less dimension than the circumferential dimension. This relative arrangement of the rubber in the flexible members insures that a very substantial mass of rubber is placed so that it acts in shear to take the driving torque. However, the thin radial dimension of the rubber strips, as compared with their relatively thick axial dimension, permits the usual relative radial and axial movements between the driving and driven parts without material opposition from the rubber, and consequently very little strain upon the parts, since the rubber will readily yield in radial and axial directions.

While a specific embodiment of the improved drive has been hereinbefore described, it will be understood that changes and modifications of this specific form shown and described may readily occur to those skilled in the art, and it is desired to include within the ambit of the invention such changes and modifications as fall within the spirit and scope of the terminology of the claims appended hereto.

What is claimed is:

1. The combination of a vehicle frame spring-supported upon a wheel and axle assembly, a rotary quill carried by the frame and surrounding an axle of said wheel and axle assembly, with free space therebetween, a driving connection from said quill to a wheel associated with said axle, said connection including a radially extending member secured to one of said quill and wheel and having a free periphery with radial faces on opposite sides thereof and a member secured to the other of said quill and wheel having radial faces, respectively, opposite the radial faces of the first member and spaced therefrom, and a pair of flexible annuli, each including spaced metallic rings interconnected by a series of rubber blocks secured to said rings throughout substantially the radial thickness of the blocks, the annuli being secured one to each pair of opposed faces of said members.

2. The combination of a tubular member, a member mounted on an axle extending through said tubular member with free play on all sides to permit relative radial displacement therebetween, a driving connection between said members, said connection including opposed annular generally radially disposed faces rigidly associated with said members and an annularly arranged series of rubber blocks having their opposed sides bonded to said faces, the rubber blocks being spaced circumferentially and radially to provide a plurality of spaced segments, said segments being of largest dimension circumferentially and of least dimension radially.

3. The combination of a tubular member, a member mounted on an axle extending through said tubular member with free play on all sides to permit relative radial displacement therebetween, a driving connection between said members, said connection including opposed annular generally radially disposed faces rigidly associated with said members and an annularly arranged series of rubber blocks having their opposed sides bonded to said faces, the rubber blocks being spaced circumferentially and radially to provide a plurality of segments, said segments having an axial dimension substantially exceeding their radial dimension.

4. The combination of a vehicle frame spring-supported upon a wheel and axle assembly, a rotary quill carried by the frame and surrounding an axle of said wheel and axle assembly, with free space therebetween, and a driving connection between said quill and a wheel associated with said axle, said connection including opposed annular generally radially disposed faces rigidly associated, respectively, with said quill and wheel and a flexible annulus secured between said opposed radially disposed faces and comprising a circumferential series of rubber blocks, each block being many times less in radial than in circumferential extent, thereby imposing relatively small resistance to relative radial displacement of said quill and the axle of said wheel and axle assembly while enhancing the capacity of the flexible annulus to take the driving torque with the rubber in shear.

JOSEPH LEDWINKA.
JOHN F. DOWNIE SMITH.